Feb. 27, 1951 T. I. MOSELEY 2,543,188
RADAR SCANNER APPARATUS
Filed April 15, 1947 10 Sheets-Sheet 1

INVENTOR.
Tomlinson I. Moseley
BY
Mellin & Hanscom
ATTORNEYS

Feb. 27, 1951 T. I. MOSELEY 2,543,188
RADAR SCANNER APPARATUS
Filed April 15, 1947 10 Sheets-Sheet 3

INVENTOR.
Tomlinson I. Moseley
BY
Mellin & Hanscom
ATTORNEYS

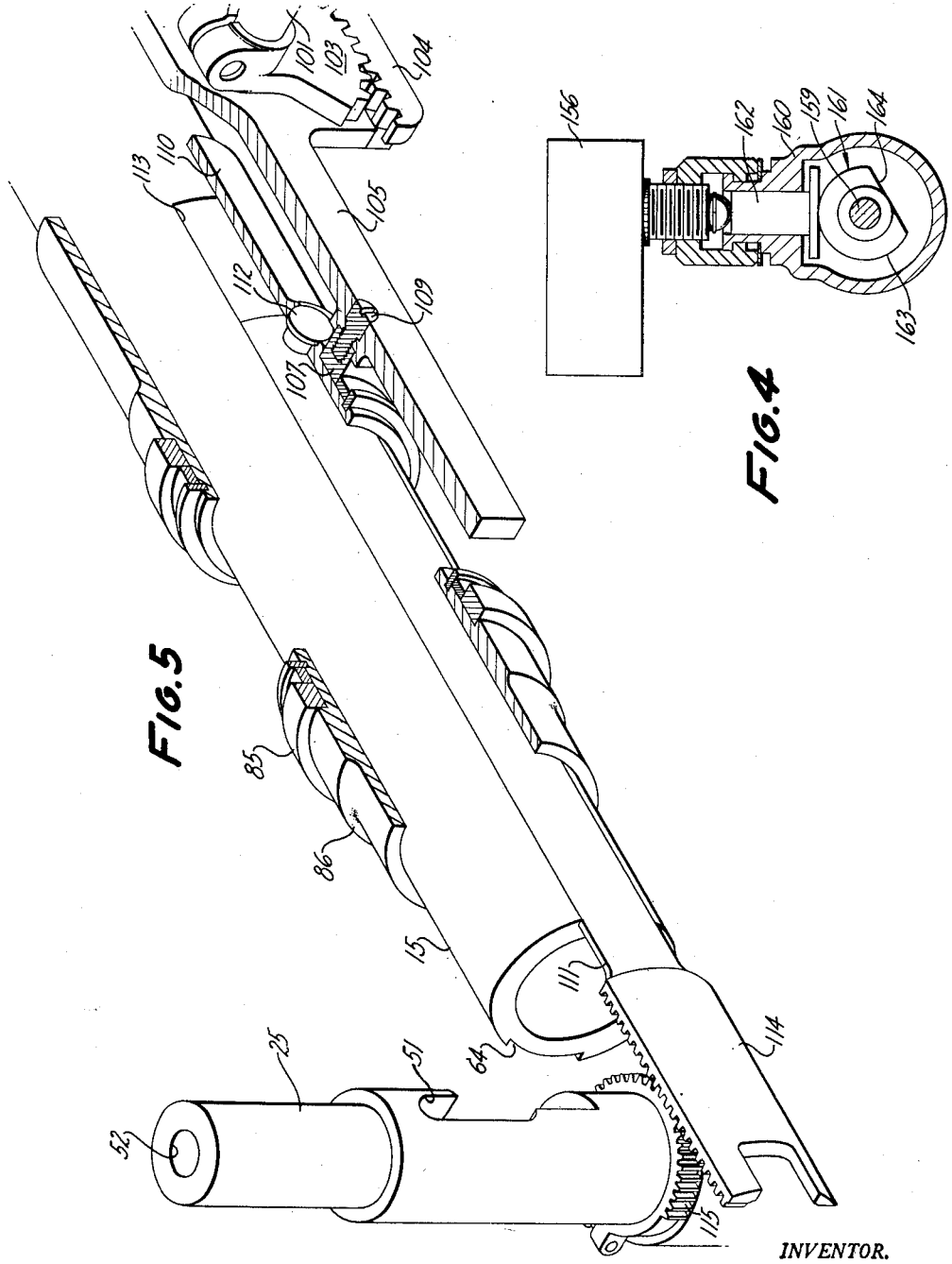

Feb. 27, 1951     T. I. MOSELEY     2,543,188
RADAR SCANNER APPARATUS
Filed April 15, 1947                    10 Sheets-Sheet 5

INVENTOR.
Tomlinson I. Moseley
BY
Mellin & Hanscom
ATTORNEYS

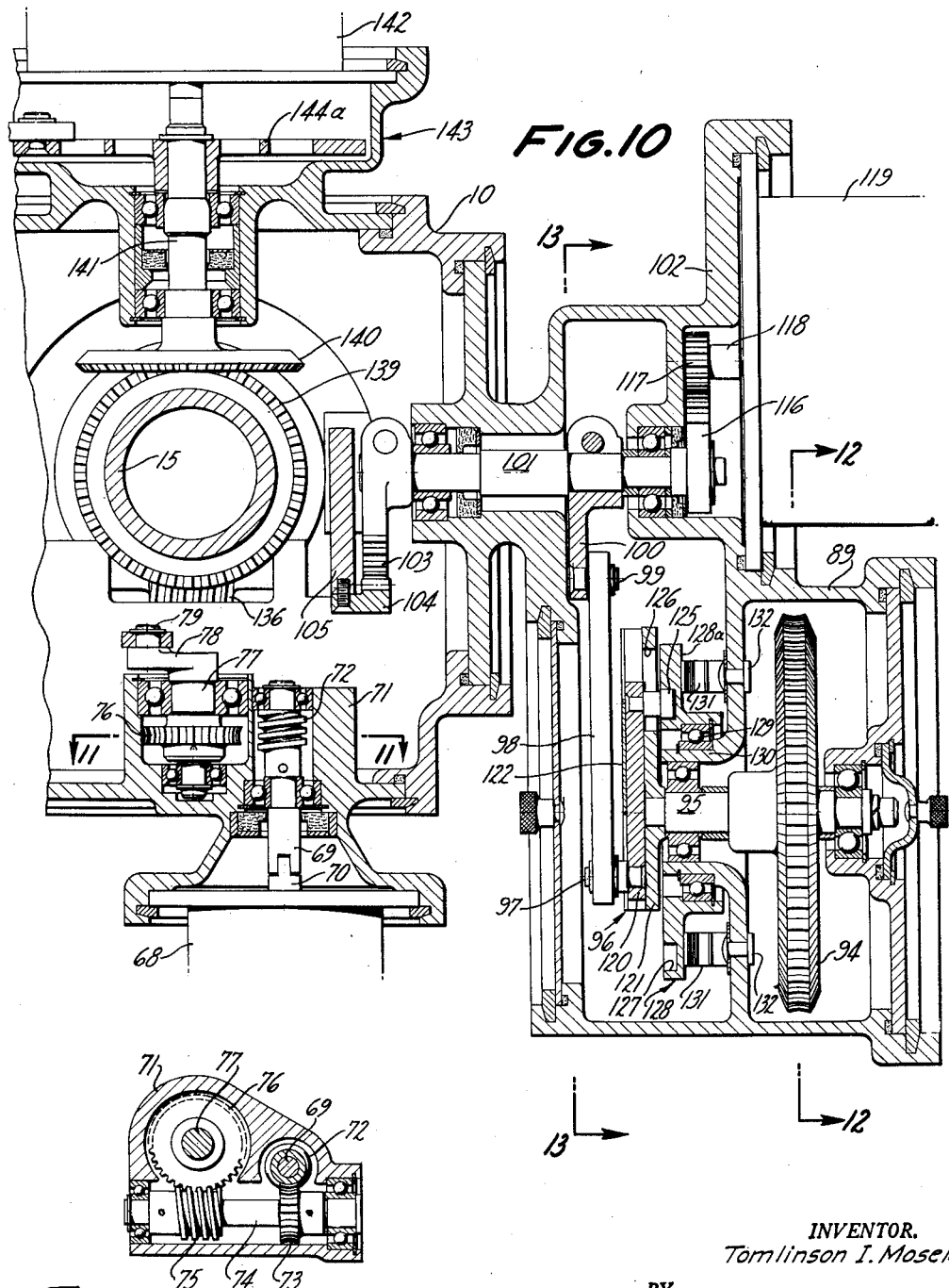

Feb. 27, 1951 T. I. MOSELEY 2,543,188
RADAR SCANNER APPARATUS
Filed April 15, 1947 10 Sheets-Sheet 8

INVENTOR.
Tomlinson I. Moseley
BY
Mellin & Hanscom
ATTORNEYS

Feb. 27, 1951 T. I. MOSELEY 2,543,188
RADAR SCANNER APPARATUS
Filed April 15, 1947 10 Sheets-Sheet 9

INVENTOR.
Tomlinson I. Moseley
BY
Mellin & Hanscom
ATTORNEYS

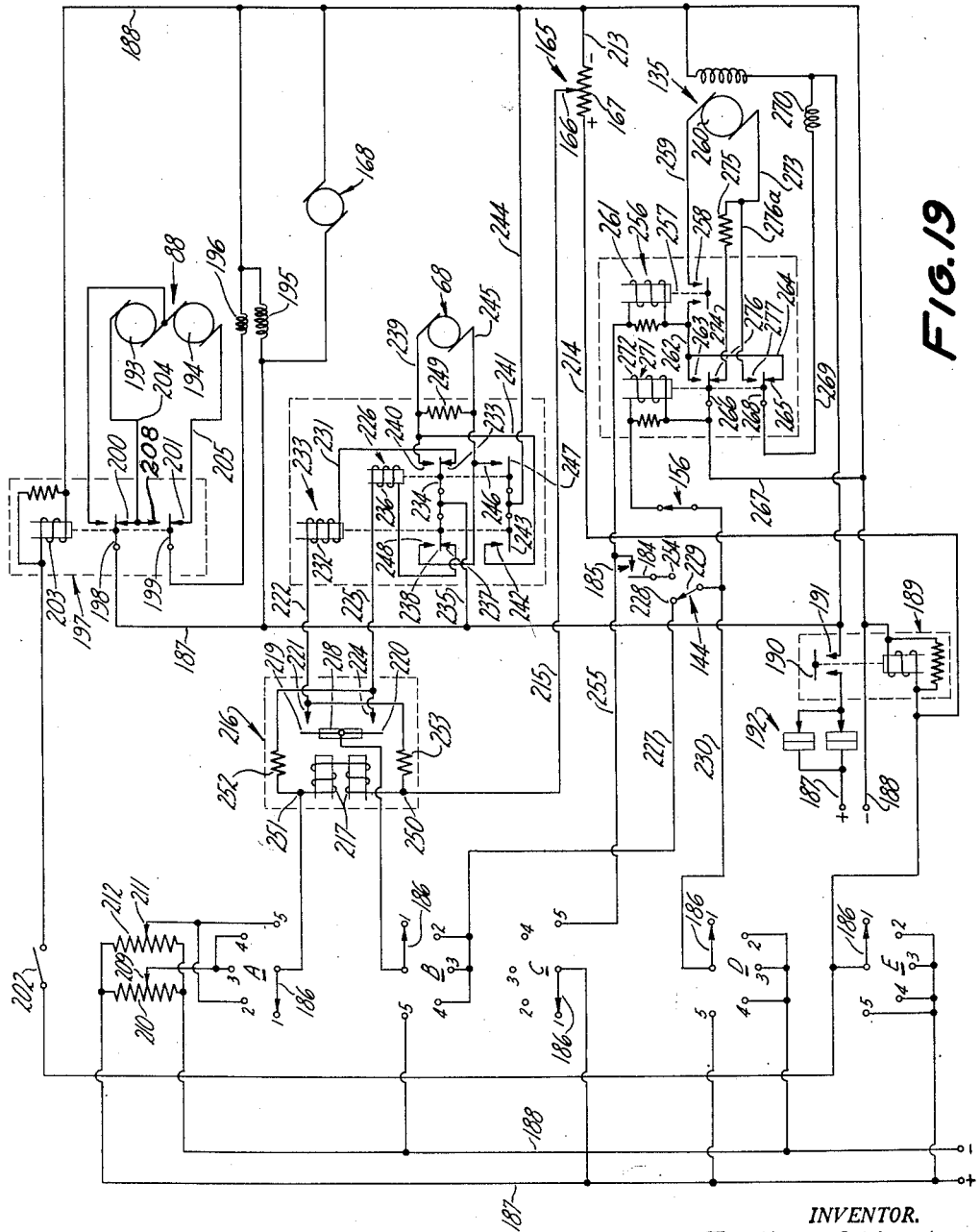

UNITED STATES PATENT OFFICE 2,543,188

RADAR SCANNER APPARATUS

Tomlinson I. Moseley, Atherton, Calif.

Application April 15, 1947, Serial No. 741,505

7 Claims. (Cl. 250—33.65)

The present invention relates to radar apparatus, and more particularly to a scanning radar antenna mechanism operable with transmitting-receiving equipment for transmitting a radio frequency beam and for receiving reflections of such beam from any target upon which it might impinge.

This invention is a continuation in part of my applications for "Radar Scanner Unit," Serial No. 672,462, filed May 27, 1946, and "Radar Scanner Unit," Serial No. 679,120, filed June 25, 1946, now Patent No. 2,479,539 granted August 16, 1949.

In the radar scanner units described in my aforesaid applications, and particularly in application Serial No. 679,120, an antenna, including a parabolic reflector and feed horn, may be simultaneously rotated about a longitudinal axis and caused to nod about an axis perpendicular to the rotational axis at two different nodding amplitudes, or the antenna can be caused to nod without rotation at the two different amplitudes of oscillation. Such selective scanning operations are performed mechanically and controlled electrically, which complicates the mechanism required and renders more difficult its maintenance in proper and effective operating condition. Accordingly, it is an object of the present invention to provide an improved radar scanning antenna apparatus whose antenna can be simultaneously rotated and nodded, or nodded alone, in response to selective electrical controls.

A further object of the invention is to provide radar scanning antenna apparatus having an antenna operable at a plurality of nodding speeds.

Still another object of the invention is to provide a radar scanning apparatus embodying an antenna capable of operation at a plurality of nodding speeds both during its nodding only (azimuth or horizontal scanning) and during its combined rotation and nodding (spiral scanning).

Yet a further object of the invention is to provide an improved device for positioning the nodding axis of the antenna vertically when it is desired to perform azimuth or horizontal scanning only. In a more limited sense, this objective involves the provision of electric controlled instrumentalities which automatically "erect" the nodding axis to the vertical upon positioning of the controls for azimuth scanning only.

Another object of the invention resides in the provision of a radar scanning apparatus having an antenna which is capable of being tilted to the horizontal.

A further object of the invention is to provide a radar scanning apparatus having an antenna which can be tilted to the horizontal, being selectively inclinable both above and below the horizontal during azimuth scanning or nodding alone.

Yet another object of the invention is to provide a radar scanning apparatus having an antenna which may be rotated about a longitudinal axis, nodded about an axis perpendicular to the rotational axis, and tilted about an axis perpendicular to the other two axes, such motions being selectively performable to obtain simultaneously rotation and nodding, nodding alone or combined nodding and tilting.

Still a further object of the invention is to prevent rotation of the antenna in a normal direction unless its tilt angle is zero.

Another object of the invention is to automatically restore the tilt angle of the antenna to zero when rotation of the antenna is desired, and to preclude such rotation until the antenna has assumed its zero tilt position.

A further object of the invention is to provide for the automatic tilting of the antenna of a radar scanner apparatus to the degree preselected by the apparatus controls.

Yet a further object of the invention is to automatically restore the tilt angle of the antenna to zero when rotation of the antenna is desired and to retilt the antenna to the previous selected tilt angle upon discontinuing its rotation.

In its general aspects, the invention contemplates a radar scanning apparatus embodying an antenna, which includes a parabolic reflector and feed horn. The antenna can be rotated by means of an electric motor and intervening mechanism; it may also be nodded by a separate electric motor and intervening mechanism; and its reflector may be tilted by means of a separate electric motor and intervening mechanism, the tilt angle being either positive or negative, as desired and selected. The electric motor for rotating the antenna about a longitudinal axis operates substantially at a constant speed, and normally in a single direction. The electric motor for the nodding or azimuth drive is a two-speed reversible motor, operable at one speed and in one direction to control the setting of the oscillating mechanism to nod the antenna at one amplitude of oscillation, and rotatable in the opposite direction at a different speed to automatically modify the mechanism driven by it and oscillate or nod the antenna at a different amplitude of oscillation.

More particularly, the nodding or azimuth motor driving mechanism may effect the nodding or oscillation of the antenna through a wide angle at a slow speed, or through a narrower angle at a faster speed. The tilt motor and its associated mechanism may effect infinite gradations of tilting, either above or below the horizontal, within specified limits. The mechanism also includes a separate motor drive for operating an air pump, which has the purpose of pressurizing the feed horn and wave guide transmission line of the apparatus.

The apparatus has several selective and operable positions, under both manual and automatic controls. The manual control has an off position, in which nothing is operable; it may be shifted to a warm-up position, in which various motors may operate, providing in effect a standby condition; the controls may be shifted to provide for selective azimuth operation at zero, positive or negative tilting of the parabolic reflector; and the controls may be arranged for spiral scanning, in which the antenna is rotated and nodded at the same time.

As indicated above in the objects of the invention, the tilt position may vary from zero degrees to both a positive and negative angle, depending upon the desire to incline the axis of the reflector above or below the horizon. A tilt position can only be maintained and produced during horizontal scanning alone. An electric interlock is provided to prevent rotation of the antenna unless the tilt angle is zero. In the event that such rotation about the longitudinal axis is desired in the normal direction, the tilt angle, if other than zero, is automatically restored to zero before the circuit through the rotating motor can be completed.

Provision is also made for insuring that the axis about which the antenna nods or oscillates is vertical when azimuth or horizontal scanning alone is desired. This takes place through electrical instrumentalities which cause the main rotating motor to operate at a comparatively slow speed intermittently in a reverse direction, to position the axis of oscillation vertically.

The angle of tilt of the reflector may be preselected manually, and the reflector will automatically follow up to the preselected angle and maintain such angle. When rotation of the antenna is desired, the tilt angle is automatically restored to zero, but, if the manual preselected degree of tilt has not been changed or set to zero, discontinuance of the antenna rotation will cause the reflector to automatically reassume the former tilted position.

One form which the invention may assume is exemplified in the following description and illustrated by way of example in the accompanying drawings, in which:

Fig. 3 is a longitudinal section through the apparatus, parts being shown in elevation.

Fig. 4 is a section taken along the line 4—4 on Fig. 2.

Fig. 5 is an enlarged isometric view, partly in section, of portions of the mechanism for nodding the antenna and also for effecting its tilting.

Fig. 10 is a cross-section through the apparatus, disclosing parts of the nodding or azimuth scanning mechanism and parts of the tilt mechanism.

Fig. 11 is a section taken along the line 11—11 on Fig. 10.

Fig. 19 is a schematic electrical circuit diagram of the control and operating mechanisms for determining the various positions and operations of the antenna.

Figure 1:
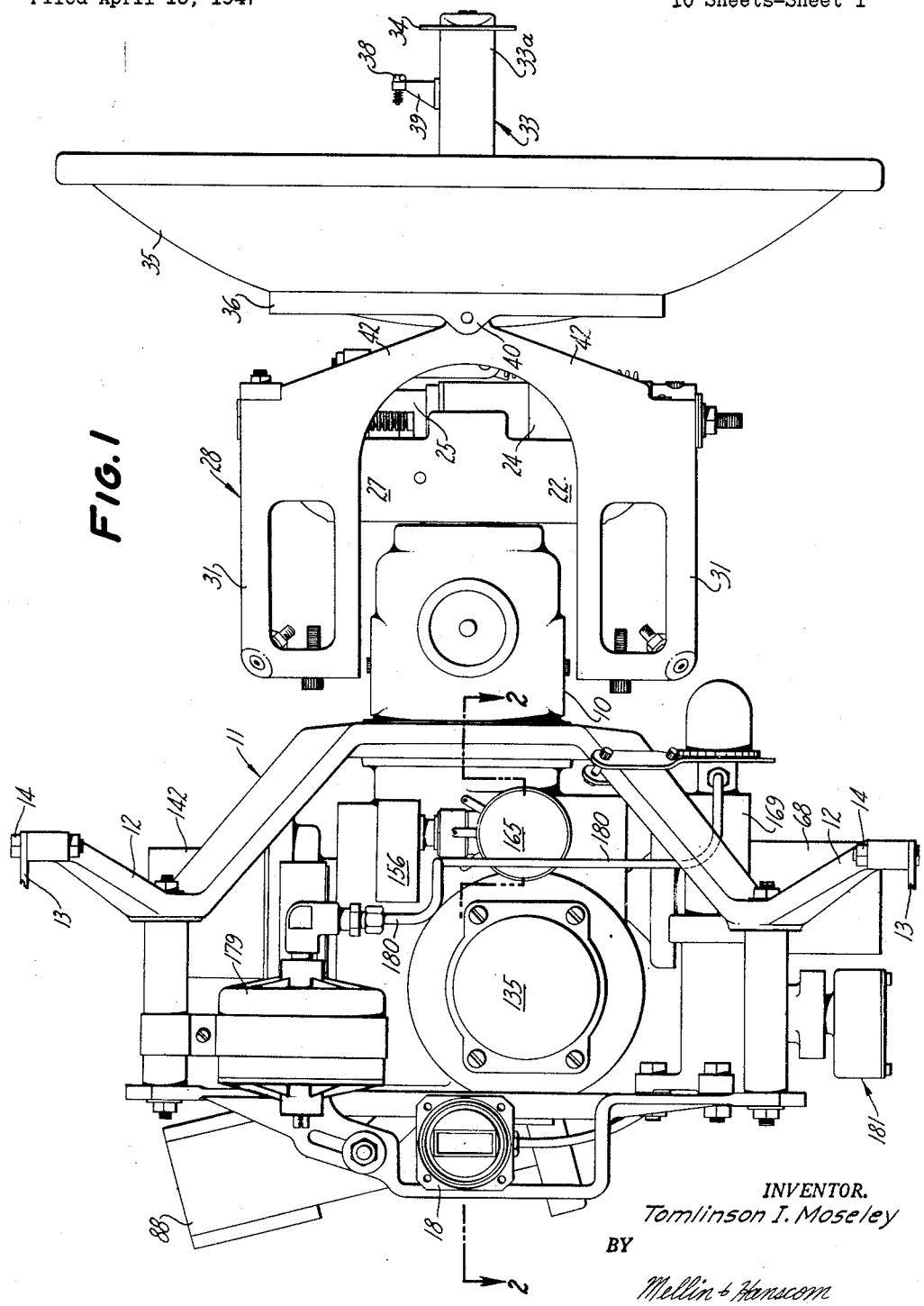
Fig. 1 is a side elevation of a radar scanner antenna apparatus.

In the form of the invention disclosed in the drawings, a main housing 10 is suitably secured within a spider 11 whose arms 12 are attachable to a support 13 by means of bolts 14. Such support may be a nacelle of an aircraft, in which the radar scanner apparatus is mounted.

A tubular main spindle 15 extends longitudinally of the housing, being supported therein by suitable forward and rearward bearings 16, 17, and constituting part of a wave guide transmission for the radio frequency energy. The rear of the spindle 15 communicates with a generally L-shaped, stationary rear wave guide 18 suitably secured to the rear of the housing 10, while the forward end of the spindle communicates with a forward wave guide in the form of an L-shaped laterally extending joint 19 whose forward longitudinal portion 20 is secured within an inwardly directed, lateral wave guide 21 fixed to the outer end of a spindle arm 22 extending laterally from and secured to the forward portion of the spindle 15. This lateral wave guide 21 supports, through the intermediary of a suitable bearing 23, a lateral oscillating feed horn 24 whose oscillating shaft 25 extends on the other side of the longitudinal axis of the spindle 15 and is supported within a suitable bearing 26 carried on the end of an opposite lateral spindle arm 27 affixed to the forward portion of the spindle.

Figure 6:
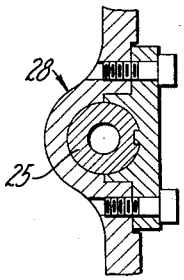
Fig. 6 is a section taken along the line 6—6 on Fig. 3.
Figure 12:
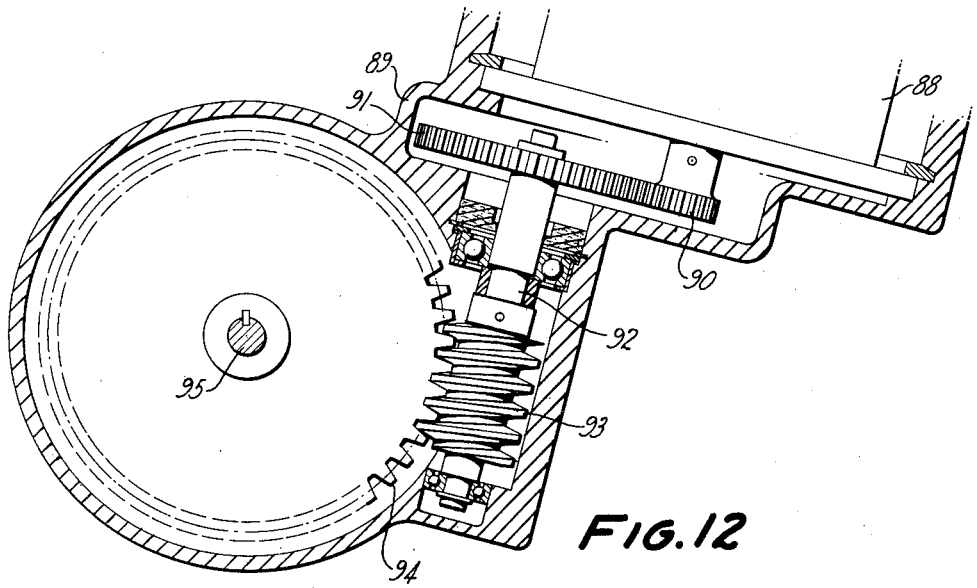
Fig. 12 is a section taken along the line 12—12 on Fig. 10.

A generally U-shaped bracket 28 is keyed, or otherwise suitably secured, on the outer end of the oscillatable feed horn shaft 25 (see Fig. 6), the opposed end of the bracket 28 being secured to a stub shaft 29 rotatably mounted within a bearing 30 mounted in the outer end of the lateral wave guide 21. The rearwardly extending arms or portions 31 of the U-shaped bracket 28 carry suitable washers 32 for statically and dynamically balancing the rotating mechanism.

A longitudinal feed horn portion 33 communicates with and is secured to the oscillating feed horn portion 24 coaxially of the main spindle 15. This longitudinal feed horn portion 33 is rectangular in cross-section and is twisted so that its forward part 33a is disposed at an angle of 90 degrees to its rearward part. Its outer end is provided with an antenna cap 34, having a vertical window (not shown) on each side of the feed horn 33 for the purpose of permitting passage of a radio frequency beam between the feed horn and a reflector 35, in the shape of a paraboloid, encompassing the rear part of the feed horn 33 and secured to a head bracket 36 which is carried on the U-shaped oscillatable bracket 28, in order to oscillate therewith during azimuth scanning and spiral scanning. The feed horn 33 passes through an enlarged central hole 37 in the reflector 35 to permit tilting of the latter with respect to the feed horn.

A parasitic dipole 38 is pivotally mounted on a bracket 39 secured to the forward stem 33a of the feed horn. The dipole extends in opposite sides of its longitudinal pivot axis and has one side weighted in order to allow centrifugal force resulting from spiral scan rotation to shift or flip the dipole out of phase with the antenna exciting field so that it has no effect on the radiation pattern. During horizontal scanning, however, the dipole 38 is disposed horizontally and distorts the beam pattern by concentrating energy in the lower side of the beam.

In view of the provision for tilting the parabolic reflector 35 about an axis perpendicular to the nodding or azimuth scanning axis of the lateral feed horn 24 and oscillating speed shaft 25, the reflector is not rigidly secured to the bracket 28. Instead, the opposed, rearwardly extending lugs 40 on the reflector head bracket are pivotally mounted on a pair of hinge pins 41, whose axis is perpendicular to the nodding axis of the antenna, fitting within opposed, forwardly extending portions 42 of the U-shaped bracket (see Figs. 1 and 8).

The reflector 35 is tiltable, and may be held in any angle of tilt within the range of the mechanism, either positive or negative, by apparatus now to be described. The reflector bracket 36 is provided with a pair of rearwardly extending arms 43 on opposite sides of its longitudinal axis, which arms each carry a pivot pin 44 mounted within an arm 45 of a vertical yoke 46 secured to the central portion of a horizontal yoke 47 by a stud 48, whose inner portion is threaded to the central portion of the vertical yoke 46 and whose outer portion is threaded to the central portion of the horizontal yoke 47. The latter yoke extends rearwardly, with its bifurcated arms 49 disposed around the feed horn shaft 25 and carrying a pin 50 extending through an elongated slot 51 in the shaft 25 into a central shaft bore 52, where the pin 50 is secured to a slide 53 guided by the wall of the shaft bore 52 and reciprocable therewithin.

Reciprocation, or inward and outward lateral movement, of the slide 53 occurs as the result of moving a lever segment 54 having forward teeth 55 meshing with rack teeth or ribs 56 on the slide 53, and whose rearward end is mounted upon a pivot pin 57 secured to the spindle arm 27. Movement of the lever segment 54 about its pivot pin 57 and corresponding movement of the slide 53 occur as a result of rotating a cam 58 about a pivot pin 59 secured to the spindle arm 27. This cam has an outer cam surface operable upon a cam follower 60 mounted on the lever segment 54, with its inner end 61 formed as a gear segment or sector whose teeth mesh with rack teeth 62 on a slide 63 mounted in an external groove or channel 64 formed longitudinally along one side of the spindle 15. Movement of the slide 63 forwardly or rearwardly correspondingly rotates the cam 58 on its pivot pin 59 and shifts the lever segment 54 about its pivot pin 57 to move the plunger 53 and yokes 46, 47 and determine the extent of tilt of the parabolic reflector 35 about the axis of the hinge pins 41.

Figure 8:
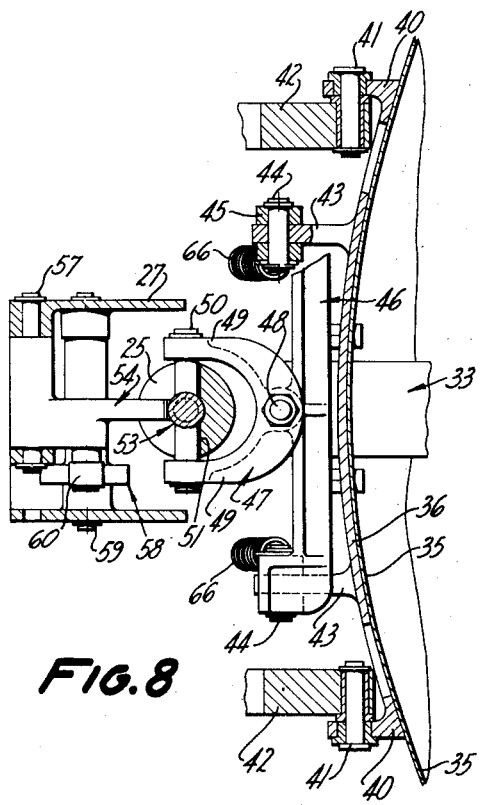
Fig. 8 is a section taken along the line 8—8 on Fig. 3.
Figure 9:
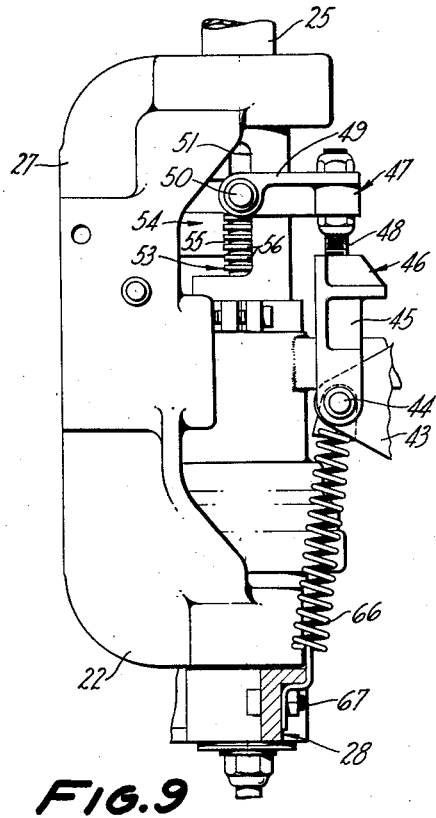
Fig. 9 is a side elevation of part of the mechanism for tilting the parabolic reflector.
Figure 7:
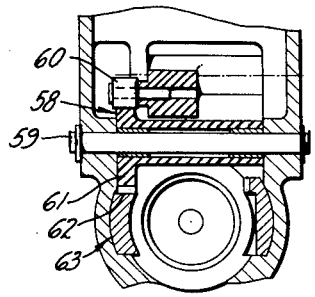
Fig. 7 is a cross-section taken along the line 7—7 on Fig. 3.

Engagement between the cam follower 60 and cam 58 is maintained by a pair of opposed tension springs 66, each spring having one end attached to a pin 44 connecting an arm 43 with the vertical yoke 46, and its other end attached to the U-shaped bracket 28 in a suitable manner, as by use of a bolt 67 (see Figs. 8 and 9). It is to be noted that the springs 66 tend to shift the vertical yoke 46 inwardly, to maintain the follower 60 engaged with the cam 58, and also tends to move the parabolic reflector 35 toward a negative tilt position, i. e., a position inclined downwardly to the horizontal.

The degree of tilt of the reflector 35 can be varied in accordance with the extent of rotation and direction of rotation of an electric tilt motor 68 suitably secured to the main housing 10 (see Figs. 3, 10 and 11, particularly). This tilt motor can be controlled for rotation in either direction in order to move the tilt slide 63 along the spindle 15, either in a forward or a rearward direction. The tilt motor 68 is adapted to shift the tilt slide 63 through a gear reducing and crank and slide mechanism. In the form disclosed in the drawings, this mechanism includes a shaft 69 coupled to the tilt motor armature shaft 70 and suitably journalled in a gear case 71. The shaft 69 carries a worm 72 engageable with a worm gear 73 secured to a cross-shaft 74 journalled in the gear case 71. Another worm 75 is attached to this cross-shaft, meshing with a worm gear 76 affixed to a crankshaft 77 rotatable in the case 71 and having a crank arm 78 extending into the main housing 10. The crank pin 79 of the crank arm is connected to one end of a connecting rod 80 (see Fig. 3), whose other end is mounted upon a pin 81 secured to the rear portion of a tilt slide 82 extending longitudinally of the main housing 10 parallel to the spindle 15, and guided for rectilinear movement within a pair of spaced brackets 83 secured to the main housing. A screw 84 secures this tilt slide 82 to a thrust bearing or yoke 85 mounted within a circumferential groove in a collar 86 secured to the tilt spindle slide 63 in any suitable manner, as by means of a pin 87. It is to be noted that the collar 86 is freely rotatable within the thrust bearing 85 upon rotation of the spindle 15.

It is apparent that rotation of the tilt motor 68 in either selected direction correspondingly rotates the crank 78 and moves the tilt slide 82 longitudinally within its brackets 83 in the selected direction, causing the tilt slide rack 63 to be moved longitudinally along the spindle 15 for the purpose of effecting tilting of the parabolic reflector 35 to the preselected angularity or degree of tilt through the agency of the cam 58, lever 54, slide 53 and yokes 46, 47, as above described.

The antenna, including the reflector 35 and feed horn 24, 33, can also be nodded or oscillated about the axis of the feed horn shaft 25 through a mechanism now to be described (see particularly Figs. 5, 10, 12 and 13). An azimuth motor 88 is suitably secured to a gear case 89 and has a driving pinion 90 mounted on its armature shaft meshing with a gear 91 secured to a shaft 92 rotatably mounted in the gear case 89 and carrying a worm 93 engageable with a worm gear 94 fixed on a crankshaft 95 which extends from the gear case, where an adjustable crank pin mechanism 96 is attached thereto (see Figs. 10 and 13). The crank mechanism includes a pin 97 connected to one end of a connecting rod 98, whose other end is mounted on a pin 99 attached to an arm 100 secured to a rack sector shaft 101 extending in one direction into the main spindle housing 10, and in the opposite direction into an azimuth potentiometer housing 102.

Figure 2:
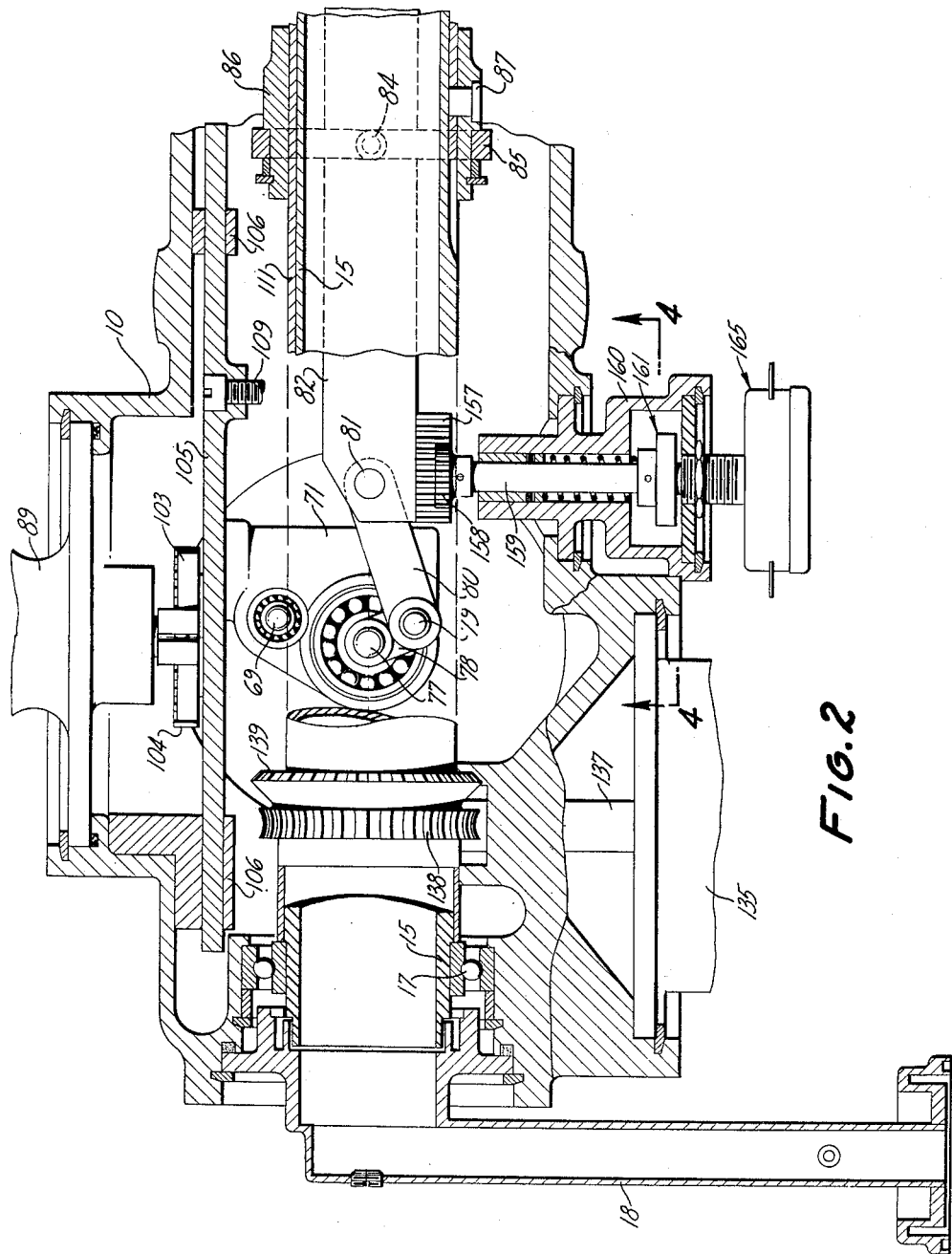
Fig. 2 is a partial longitudinal section on an enlarged scale taken along the line 2—2 on Fig. 1, and disclosing the mechanism for rotating the antenna and also part of the device for tilting the reflector and for controlling its degree of tilt.

The inner end of the shaft 101 has a gear segment 103 secured to it meshing with a gear rack 104 fixed to a longitudinally extending slide 105, reciprocable lengthwise of the main housing 10 within guide supporting brackets 106 secured within the housing 10 (see Fig. 2 for the slide and brackets). The reciprocating movement of the slide 105 is transmitted to a thrust bearing 107 secured to the slide by a screw 109. This thrust bearing 107 is received within a circumferential groove of a rotatable collar 110 fixed to a slide 111 by a coupling pin 112. The connection between the thrust bearing and collar is such as to allow the latter to rotate with the spindle in the former. The slide 111 is positioned within a longitudinal channel or groove 113 in the exterior of the spindle 15 located opposite to the tilt slide channel or groove 64, and has a rack 114 at its forward end whose teeth are engageable with a gear segment 115 fixed to the oscillatable feed horn shaft or transverse spindle 25 of the scanner apparatus.

It is apparent that rotation of the motor 88 in either direction revolves the crank pin 97 and oscillates the arm 100 through the intermediary of the connecting rod 98, correspondingly oscillating the shaft 101 and the gear segment 103 engageable with the reciprocable rack 104, reciprocating the slide 105 attached thereto, the collar 110 rotatable with the spindle 15, and the spindle slide 111 and rack 114, which, in turn, produces an oscillation of the antenna, including the feed horn 24, 33 and parabolic reflector 35, about the feed horn transverse axis.

The outer end of the oscillatable shaft 101 has another gear segment 116 attached thereto meshing with a gear 117 fixed to the shaft 118 of an azimuth potentiometer 119, which potentiometer operates in synchronism with the oscillation of the antenna 24, 33, 35 to indicate the azimuth position of a beam reflected from a target on a viewer of the transmitter-receiver apparatus connected with the antenna. This synchronizing arrangement forms no part of the invention described in the present application, and requires no further details for an understanding of such invention.

The amplitude of oscillation or nod of the antenna may be varied by adjusting the throw of the crank pin 97. As disclosed in the drawings, the crank pin is secured to one end of a slide 120 mounted for radial movement within a head 121 and retained in such head by a suitable outer plate 122 attached to the head by screws 123, or the like. The pin 97 extends through a slot 124 in the plate, which permits radial movement of the pin 97 and slide 120 transversely of the head 121. The other end of the slide 120 has a pin 125 therein extending through a slot 126 in the head 121 and received within a spiral track 127 of a cam 128 rotatably mounted on a bearing 129 supported upon a boss 130 extending from the gear case 89. Rotation of this cam 128 is continually resisted by a brake device 131 bearing frictionally against the rear face 128a of the cam and secured to the gear case 89 in any suitable manner, as by means of rivets 132.

A change in the throw of the crank pin 97 occurs automatically, depending upon the direction of rotation of the azimuth motor 88. Assuming that the azimuth motor is rotated in one direction, the shaft 95, crank head 121, crank slide 120 and crank pin 97 are rotated in a given direction, which may be assumed to be clockwise, as disclosed in Fig. 13. Such clockwise motion causes the follower pin 125 secured to the crank slide 120 to move outwardly of the spiral cam track 127 until it is disposed in its outermost position at the end 133 of such track. The tracking of the pin 125 to its outermost extent moves the crank pin 97 on the other side of the crank mechanism axis to its innermost position, thus decreasing the throw of the crank pin, and correspondingly decreasing the amplitude of oscillation of the antenna. In the operation of the adjustable crank device 96, the rotation of the cam 128 is at first resisted by the friction brake 131, until the follower pin 125 engages the end 133 of the cam track 127, after which the pin 125 couples the cam 128 to the crank slide 120 and head 121, and all of the parts rotate together against the frictional resistance offered by the brake 131.

Figure 13:
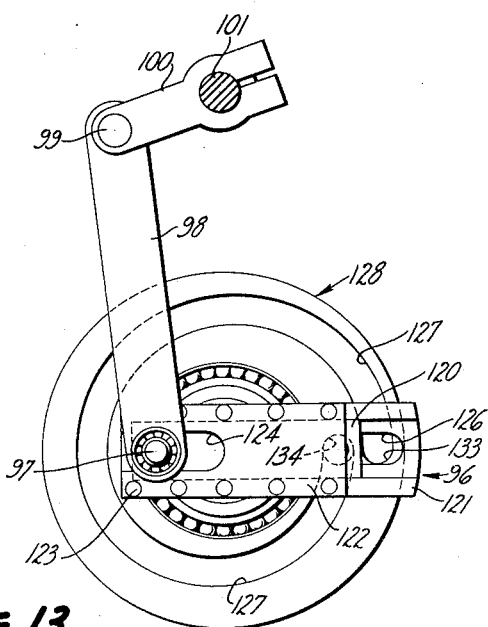
Fig. 13 is a section taken along the line 13—13 on Fig. 10.

A change in the crank throw can be made through rotating the azimuth motor 88 in the opposite direction, which effects rotation of the crank pin mechanism in a counter-clockwise direction (as seen in Fig. 13). The friction brake 131 again resists rotation of the cam 128, causing the follower pin 125 to track inwardly of the spiral cam groove 127 to the fullest extent, as determined by its engagement with the inner end 134 of the track. Such inward movement of the follower pin 125 positions the opposed crank pin 97 in its outermost location, in which position it has a maximum throw. Here again, engagement of the follower pin 125 with the inner end 134 of the cam track 127 couples the cam 128 to the slide 120 and head 121 and causes unitary rotation of all of the crank parts against the frictional resistance of the brake 131. With the greater throw of the crank pin, the antenna 24, 33, 35 and the arm (not shown) of the azimuth potentiometer 119 are oscillated or caused to nod through a greater amplitude.

In the particular mechanism described in this application, the azimuth motor 88 has different speeds, depending upon its direction of rotation. When rotated in a direction as to automatically move the crank pin 97 inwardly to its smaller throw, the motor operates at a high speed, in order to produce azimuth scanning and spiral scanning at a high speed, but small amplitude of arc. Reversal in the direction of rotation of the motor 88 increases the throw of the crank pin 97, but the motor is operating at a slower speed, to provide azimuth and spiral scanning at a wide amplitude and slow speed. The electric circuits for obtaining the operations just described will be referred to hereinafter.

In addition to providing driving and operating mechanisms for tilting and nodding the antenna, it may be rotated about the longitudinal axis of the apparatus by rotating the main drive spindle 15. A separate electric motor drive is provided for this purpose, including an electric motor 135 suitably secured to the main housing 10 of the apparatus, and having a worm 136 secured on the inner end of its armature shaft 137 meshing with a worm gear 138 fixed to the rear portion of the spindle 15 (see Figs. 2, 3 and 10). Secured to the worm gear 138 is a bevel pinion 139 meshing with a bevel gear 140 attached to the shaft 141 of a generator 142, which furnishes current for the operation of the transmitter-receiver portion of the radar scanner apparatus, and which forms no part of the present invention. The drive between the spindle 15 and generator 142 is at a 1 to 1 ratio, and the shaft 141 on which the bevel gear 140 is secured also serves to operate an erecting device 143 for restoring or positioning the nodding axis, for azimuth scanning alone, to the vertical, as will be described in detail hereinafter.

From the mechanisms described, it is possible to rotate the main drive spindle 15, forward wave guide L-shaped joint 19, lateral wave guide 21, oscillating feed horn portion 24, longitudinal forward extending feed horn portion 33, parabolic reflector 35, and all of the other parts secured to the spindle arms 22, 27, about a longitudinal axis, as well as oscillating the parabolic reflector 35 and feed horn 24, 33 about the transverse axis of the feed horn shaft 25. In addition, the parabolic reflector 35 may be tilted either upwardly or downwardly. It is desired to provide for selective operation of the apparatus through azimuth scanning alone, in which the reflector 35 of the antenna may assume a zero degree of tilt, or a plus or minus degree of tilt; or to perform spiral scanning, in which the degree of tilt must be zero and in which the main drive motor 135 is rotating the spindle 15 at the same time that the azimuth motor 88 is oscillating the parabolic reflector 35 and feed horn 24, 33. As stated above, oscillation can take place through two different amplitudes and at two different speeds.

Figure 17:
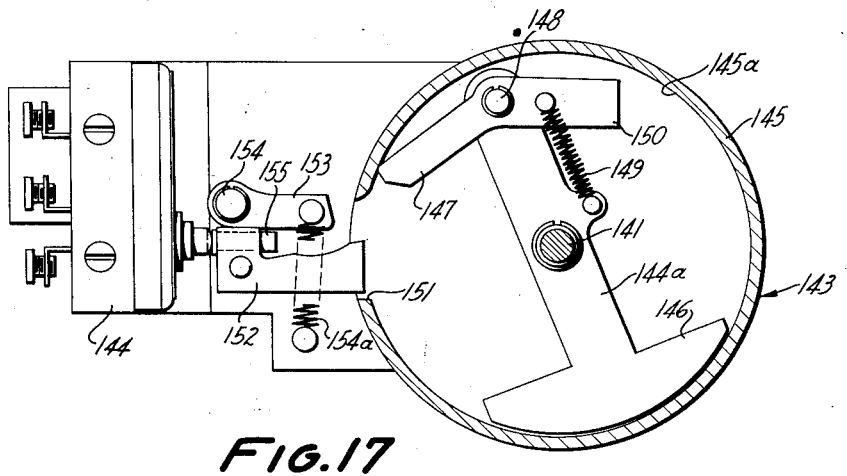
Fig. 17 is a section taken along the line 17—17 on Fig. 3 of the erecting mechanism with its parts in one operative position.
Figure 18:
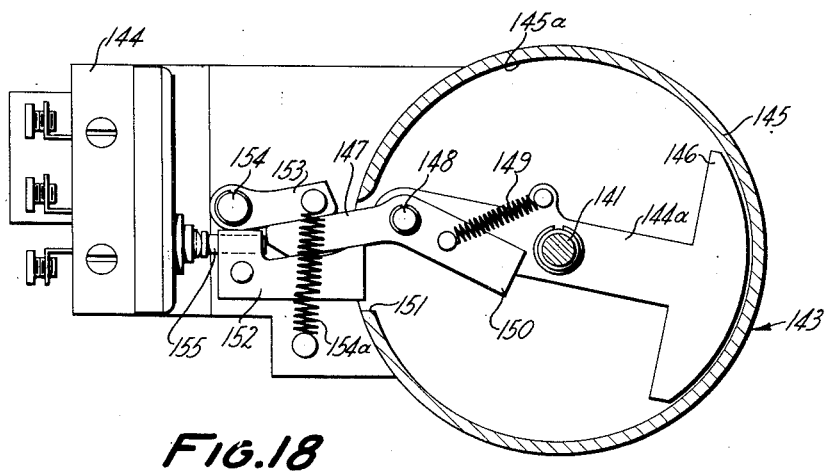
Fig. 18 is a view similar to Fig. 17, with the parts disclosed in another operative position.

Rotation of the spindle 15 also serves to rotate the erecting mechanism 143 for controlling a switch 144 in the spindle driving motor control circuit, which will indicate whether the azimuth oscillatable axis is vertical or non-vertical. During rotation of the spindle 15 in the normal driving direction, the shaft 141 for the erecting mechanism 143 and the generator 142 is rotating in a definite direction, as in a clockwise direction, as seen in Figs. 17 and 18. The erecting mechanism includes an arm 144a secured to the shaft 141 within a housing 145 and having a counterweight 146 on one end at one side of the shaft, and a switch operating finger 147 pivotally mounted on a pin 148 attached to the arm on the other side of the shaft 141. The finger 147 is urged in an outward direction, tending to bear against a cylindrical wall 145a of the housing, by a tension spring 149, one end of which is secured to the arm 144a and the other end to a weight 150 integral with the finger 147 and extending in the opposite direction from its pivot pin 148.

Normally, rotation of the shaft 141, arm 144a, counterweight 146, finger 147, spring 149 and weight 150 in a clockwise direction, as seen in Figs. 17 and 18, causes the finger weight 150 to swing outwardly to a slight extent against the tension of the spring 149 and holds the finger 147 spaced inwardly slightly of the housing wall 145a so as to avoid rubbing thereagainst. However, reversal in the direction of rotation or movement of the shaft 141 and the parts enables the finger 147 to move outwardly through a housing opening 151, and into a guide, formed by a stationary guide member 152 and a movable guide member composed of a lever 153 oscillatably mounted on a pin 154 and urged toward the opposite guide member 152 by a spring 154a secured to the lever 153 and to the housing 145. The finger 147 bears against a plunger 155, which operates the switch 144, moving it to a position indicative of the fact that the nodding axis is at the vertical. When this position is reached, the spindle driving motor 135 ceases its operation in a reverse direction, the spindle 15 being stopped with the azimuth axis vertical and the feed horn portion 24 down.

The ability of the drive motor 135 to function is also determined by the tilt mechanism. Since rotation of the drive motor 135 is only to be permitted when the parabolic reflector 35 is at its zero tilt position, the circuit through the drive motor includes a switch 156 which is moved in accordance with the position or degree of tilt of the reflector. Such operation is performed by attaching a rack 157 to the tilt slide 63 which meshes with a pinion 158 attached to a shaft 159 journalled in a switch housing 160 secured to the main housing 10 of the apparatus (see Figs. 2 and 4). A cam 161 is secured to this shaft 159 and is engageable with a plunger 162 slidable in the housing 160 and adapted to operate the interlock switch 156, to maintain the switch open in the event the degree of tilt is other than zero, and to permit the switch to close in the event the angle of tilt is zero. The cam 161 consists of an arcuate peripheral surface 163 and a flat surface 164. When the flat surface 164 is in contact with the plunger or slide 162, the degree of tilt is zero and the plunger 162 is permitted to move toward the cam shaft 159 and allow the switch 156 to close.

The tilt shaft 159 on which the tilt cam 161 is secured also extends into a tilt potentiometer 165 and is connected to a potentiometer arm 166 movable over a suitable resistance 167 contained therewithin for the purpose of producing any desired degree of tilt selected by the operator on the main control panel.

Figure 14:
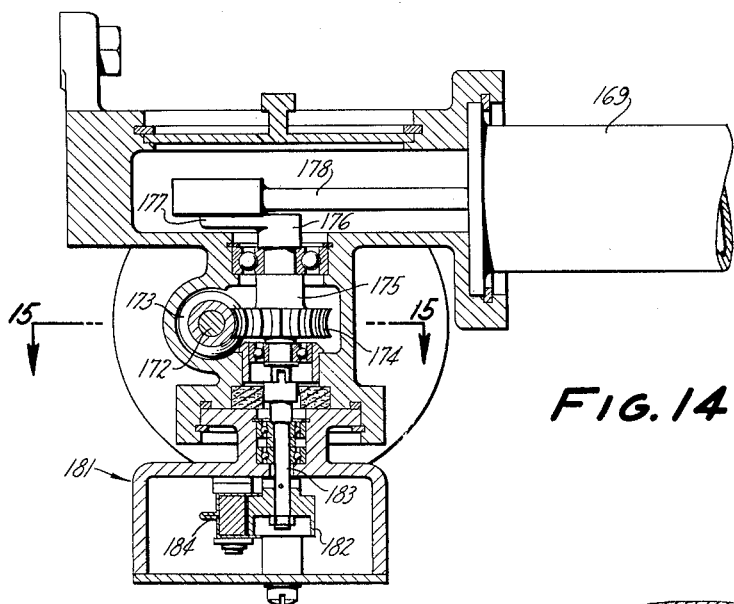
Fig. 14 is a section through the mechanism for operating the air pump and pulser mechanism.
Figure 16:
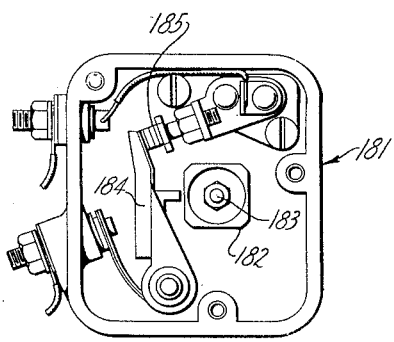
Fig. 16 is an elevation of the pulser mechanism shown in Fig. 14, with its housing cover removed.
Figure 15:
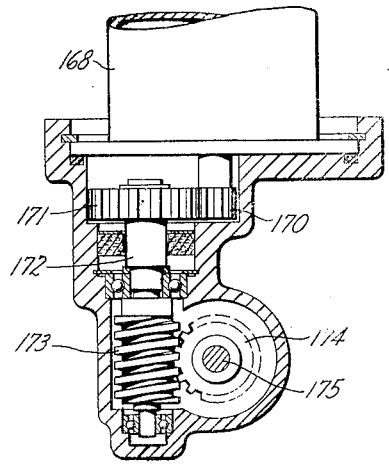
Fig. 15 is a section taken along the line 15—15 on Fig. 14.

The apparatus also includes a pump and pulser motor 168 which is adapted to drive a pump 169 through a suitable reducing gear and crank mechanism (see Figs. 14, 15 and 16). Specifically, as disclosed in the drawings, a pinion 170 is secured to the motor shaft, meshing with a gear 171 affixed to a shaft 172 carrying a worm engageable with a worm gear 174 secured to a crankshaft 175. One end of the crankshaft has a crank arm 176 attached thereto, whose crank pin 177 mounts one end of a connecting rod 178 for reciprocating the piston (not shown) in the pump cylinder 169. The purpose of the pump is to pressurize the wave guide and maintain it under pressure conditions regardless of the operating altitude of the aircraft in which the apparatus is mounted, in order to prevent electrical breakdown of the R. F. elements. Air is drawn through an air cleaner 179 and piping 180 into the pump 169, being discharged from the pump through suitable piping into the wave guide. The air pump 169, by itself, forms no part of the present invention and requires no further descriptive details.

The pump motor 168 also operates a pulser mechanism 181, employed in connection with the erecting of the nodding axis of the apparatus to the vertical when azimuth scanning alone is to be performed. This pulser mechanism is driven by the pump mechanism crank shaft 175, consisting of a known make-and-break mechanism embodying a cam 182 mounted on a shaft extension 183 and engageable with a movable contact arm 184, which may be engaged and disengaged from a stationary contact 185. As described below, this make-and-break device 181 forms part of the control circuit for the spindle driving motor 135.

By referring to the circuit diagram on Fig. 19, the electric control of and interlock between the various motors, relays, switches, etc., will be understood. The control panel includes five decks, A, B, C, D, E, whose control arms 186 are secured for operation in unison over five different contacting positions, designated in the drawings by the numbers 1 to 5. The No. 1 contact is the off position. Movement of the arms 186 to the No. 2 contact provides a warm-up position. Their movement to the No. 3 and No. 4 contacts effects the same operation of the device, the No. 3 contact affording a combined azimuth and tilt position for "beacon" scanning, while the No. 4 contact position is provided for azimuth and tilting for "search" scanning, the nature of the pulses applied to the R. F. sections being different for the two types of scanning. The distinctions between the two types of scanning, however, are immaterial to an understanding of the present invention. Movement of the arms 186 to the No. 5 contacts produces spiral scanning, in which the antenna is rotated about the longitudinal axis of the spindle 15, while it is simultaneously oscillated or nodded about the vertical axis of the apparatus.

The circuits include main positive and negative buses or lines 187, 188, which are connectible to the various motors and controls of the apparatus. The simultaneous placing of the manual control arms 186 in engagement with the No. 2 contacts will complete a circuit in deck E through a main power relay 189, which is then connected directly across the negative and positive buses, and which will pull its switch arm 190 into engagement with the spaced contacts 191 of the positive bus 187 and permit current to flow into the various electrical portions of the apparatus, passing through a thermal cut-out switch 192 in the positive bus line.

The azimuth motor 88 includes, in effect, two armatures 193, 194, comprising a high speed armature 193 and a low speed armature 194, connectible in series with each other. The azimuth motor also has a shunt field 195 and a series field 196, there being a double pole, double throw reversing relay 197 for determining both the speed and the direction of rotation of the azimuth motor 88, which, as indicated above, determines the throw of the crank pin 97 and the amplitude and period of oscillation of the antenna paraboloid reflector 35 and feed horn 24, 33 during azimuth and spiral scannings. The switch arms 198, 199 of the relay occupy the positions disclosed in Fig. 19, in contact with the lower switch contacts 200, 201 when the relay is not energized. Such energizing only occurs upon the closing of a nod control switch 202 in series with the relay coil 203, and serving to connect the coil across the positive and negative buses 187, 188 when the manual control arm 186 in deck E engages Nos. 2, 3, 4 and 5 contacts.

In the position disclosed, the switching arrangement connects the high and low speed armatures 193, 194 in series with each other, with the high speed armature 193 connected to the plus bus 187 through the lead 204, contact 200 and arm 198 and the low speed armature 194 connected in series with the series field 196 through the lead 205, contact 201 and arm 199, which, in turn, is connected to the negative bus 188, thus completing the circuit through the motor. The shunt field 195 is at all times connected across the positive and negative buses 187, 188. In view of the circuits just described, the azimuth motor 88 will rotate at a slow speed and in such direction as to produce shifting of the crank pin 97 to its greatest throw position, to provide a wide scanning angle.

In the event that the nod control switch 202 is closed, the circuit through the azimuth relay 197 will be completed, which will move the switch arms 198, 199 upwardly from the positions shown in Fig. 19, so as to reverse the polarity of the high speed armature 193 by connecting its former positive side to the negative bus 188 through the lead 204, contact 206 and arm 199. With such switching arrangement, the low speed armature 194 is disconnected from the circuit, although the series field 196 remains connected in series with the high speed armature 193. In view of the substantially lower resistance of the high speed armature alone, as compared to its series connection with the low speed armature previously described, and in view of its reverse polarity, the azimuth motor 88 is then rotated in a reverse direction and at a substantially higher speed. Such reversal in the direction of rotation effects a shifting of the crank pin 97 to its innermost position to provide a high speed, narrow azimuth scan of the antenna.

The tilt motor 68 may be operated and the angle of tilt of the parabolic reflector 35 controlled manually by the operator in accordance with the selective setting of a potentiometer arm 209 along a potentiometer resistance 210 connected across the positive and negative buses 187, 188, or in accordance with the zero tilt setting of an arm 211 contacting a second potentiometer resistance 212 connected across the positive and negative buses. The tilt motor will be operated and caused to rotate in such direction as to move the tilt return potentiometer arm 166 (connected to the shaft 159 carrying the pinion 158 engaging the rack 157 secured to the tilt slide 82) to follow up or occupy the position corresponding to the setting of the manual tilt control arm 209 or the zero tilt arm 211, depending upon which of the two last-mentioned arms is connected in the circuit.

The tilt return potentiometer arm 166 is movable across the resistance 167 connected across the negative and positive buses 187, 188 through the leads 213 and 214, when the main switch arm 186 of deck E is turned from its No. 1 position into engagement with either the No. 2, 3, 4 or 5 contacts. As a result, current will flow through this potentiometer 165, the side of the potentiometer connected to the negative bus being considered as negative and the side connected to the positive bus as positive. The tilt return potentiometer arm 166 is connected through a lead 215 and a micropositioner 216 to the manual control arm 186 of desk A, which may make contact with either the No. 2 or No. 5 contact connected to the zero tilt arm 211, or with the No. 3 or No. 4 contact connected to the manual tilt control selector arm 209. Such circuit between the tilt return potentiometer arm 166 and the zero and manual tilt control arms 211, 209 is established through an electromagnetic coil 217 of the micropositioner 216 adapted to attract, in one direction or another, a pivotally mounted armature 218 having oppositely extending contact arms 219, 220 mounted thereon. Pivoting of the armature in one direction engages one contact arm 219 with a fixed contact 221 from which a lead 222 runs to an upwardly tilting relay 233, while the pivoting of the armature in the opposite direction causes its other arm 220 to engage a contact 224 from which a lead 225 runs to a downwardly tilting relay 226.

The circuits through the relays 223, 226 include the manual control arm 186 of deck B, which is adapted to engage either the No. 2, 3 or 4 contact, from which a lead 227 runs to a contact 228 of the vertical erecting switch 144, whose switch arm 229 is disclosed in position indicative of the fact that the nodding axis is vertical, to permit the circuit through the tilt-up and tilt-down relays 223, 226 to be completed to the negative bus 188, through the line 230 when the switch arm 186 of deck D is engaged with either the No. 2, 3 or 4 contact.

The tilt-up relay 223 has a lead 231 running from its electromagnetic coil 232 to a contact 233 which is normally engaged by an arm 234 movable by the tilt-down relay 226, this arm being connected to a lead 235 running to the positive bus 187. Similarly, the tilt-down relay 226 has its electromagnetic coil 236 connected to a contact 237 engaged by an arm 238 controlled by the tilt-up relay 223 and connected to the lead 235 running to the positive bus.

The tilt motor 68, which has a permanent magnetic field, may be connected across the positive and negative buses 187, 188 so as to produce its operation in either a forward or reverse direction, depending upon the tilting of the reflector 35 upwardly or downwardly. The upper lead 239 from the tilt motor armature is connected to a contact 240 which is engageable by the arm 234 actuated by the tilt-down electromagnet coil 236, and which is also connected through a branching lead 241 to a contact 242 engaged by an arm 243 operated by the tilt-up coil 232 and having a lead 244 running to the negative bus 188. Similarly, the other side of the armature has a lead 245 connected to a contact 246 engaged by an arm 247 movable by the tilt-down relay 226, the lead 245 also running to a contact 248 engageable by the upper arm 238 of the tilt-up relay 223. The upper arms 234, 238 are connected, as indicated above, to the positive bus 187, while the lower arms 243, 247 are connected through the lead 244 to the negative bus 188. A resistance 249 is also connected across the tilt motor armature in order to provide an electric brake on the motor and to dissipate the inductive kick present when the tilt motor circuit is opened.

As disclosed in the circuit diagram, neither the tilt-up nor tilt-down relay 223 or 226 is energized and no current flows through the tilt motor 68, the tilt angle of the reflector 35 remaining unchanged.

Let it be assumed that the switch arms 186 are engageable with the No. 2 contacts, which places the zero tilt arm 211 in the circuit, and that the reflector 35 is tilted downwardly, which causes the tilt return potentiometer arm 166 to occupy a corresponding position to the left of the resistance midpoint, as disclosed in the circuit diagram. Since the tilt return potentiometer resistance 167 is connected directly across the positive and negative buses 187, 188, a greater resistance is provided on the negative side of the potentiometer than on the positive side, which will cause the tilt arm 166 to have a positive polarity, and also the electromagnetic micropositioner coil 217 at point 250 to have a positive polarity as compared to the polarity of the other end 251 of the coil, since the zero tilt potentiometer arm 211 connected to it is at the midpoint along its resistance 212. Accordingly, the electromagnetic coil 217 is energized to attract the armature 218 and swing it in a clockwise direction about its pivot and moves its arm 219 into engagement with the tilt-up contact 221, completing the circuit to the tilt-up relay 223. Energization of this relay pulls its associated contact arms 238, 243 upwardly, so as to engage the upper arm 238 with the upper contact 248 of the tilt motor 68, and its lower arm 243 with the lower contact 242 of the tilt motor. Such contact engagement places a positive polarity on the lower lead 245 of the tilt motor and a negative polarity on its upper lead 239, causing the tilt motor 68 to rotate in an up-tilt direction to reduce the angle of tilt of the reflector 35 from the downward angle toward a zero angle. As such reduction occurs, the tilt return potentiometer arm 166 is moved through the rack 157 and pinion 158 toward its midpoint, along the resistance 167 corresponding to the zero setting on the control panel, decreasing its positive polarity. When such midpoint is reached, the polarity of the arm 166 is neutral, and flows through the electromagnet 217, allowing the armature 218 to assume a neutral position out of engagement with the tilt-up contact 221, the tilt-up relay 223 becoming deenergized and the contact arms 238, 243 assuming their initial positions, as disclosed in the diagram, breaking the circuit to the tilt motor.

Conversely, if the tilt return potentiometer arm 166 had been in a position to the right of its neutral point, as seen in the wiring diagram, in view of an upward tilt angle, its polarity would have been negative, making the lower end 250 on the coil 217 negative and its other end 251 relatively positive, causing the armature 218 to swing in a counter-clockwise direction into engagement with contact 224, completing the circuit through the tilt-down relay 226, which moves its upper and lower arms 234, 247 upwardly into engagement with the tilt motor contacts 246, 240 connecting the lower lead 245 to the negative bus 188 and the upper lead 239 to the positive bus 187, or reversely to the aforementioned connections, reversing the direction of rotation of the tilt motor 68, which tilts the reflector 35 down toward its zero position. When such zero position is reached, the tilt return potentiometer arm 166 would occupy a midpoint position, so that no difference of potential would exist across the coil 217, the armature 218 returning to its inoperative position, breaking the circuit through the tilt motor, which is stopped promptly by the electric braking resistance 249.

Movement of the manual control arm 186 in deck A to the No. 3 or No. 4 position would have placed the manual tilt control 209, 210 in the circuit, rather than zero tilt control 211, 212. However, the operation of the tilt return potentiometer 165 would have been the same. The degree of tilt, either up or down (positive or negative), could be selected within the limits of the apparatus by moving the manual tilt control arm 209 along its resistance 210, and the arm 166 on the tilt return potentiometer would be caused to follow up to this preselected manual position, in view of the current and the direction of current caused to pass through the electromagnetic coil 217 of the micropositioner 216.

For the purpose of preventing the tilt motor 68 from overrunning the manual tilt control or zero tilt settings, with resultant hunting, a resistance 252 is connected between the tilt-down lead 225 and the point 251 of the coil 217, and another resistance 253 between the tilt-up lead 222 and the other end 250 of the coil. When the circuit through the tilt-up lead 222 is completed, a negative polarity is transmitted through the lower resistance 253 to the point 250, reducing its positive polarity slightly, and causing a zero potential difference across the coil 217 to occur slightly before the tilt return potentiometer arm 166 has been moved into exact correspondence with the position of the manual tilt control arm 209 or zero tilt arm 211. As a result, the circuit to the tilt motor 68 is opened a fraction of a second, or a fraction of a tilt motor revolution, before the tilt return potentiometer arm 166 has been moved to such position of correspondence, there being sufficient inertia in the tilt mechanism parts to continue their movement slightly so as to bring the parabolic reflector 35 and the tilt return potentiometer arm 166 into exact correspondence with the manual tilt control or zero tilt control settings.

Conversely, completion of the circuit through the tilt-down relay 226 will provide a slight negative potential through the upper resistance 252 on the upper end 251 of the coil 217, which then has a predominant positive polarity, the potential difference across the coil 217 being reduced to zero slightly in advance of movement of the reflector 35 and tilt return potentiometer arm 166 into exact correspondence with the zero tilt or manual tilt control potentiometer arms 211 or 209.

The motor 135 for rotating the driving spindle 15, the erecting mechanism 144 and generator 142 can be variously connected in the circuit, depending upon the position of the manual control arm 186 with respect to the various contacts. The motor will only be in position for driving the spindle in its normal direction during spiral scanning, when the arms 186 engage the No. 5 contacts, but it may be connected in the circuit when the arms are in engagement with the No. 2, 3 and 4 contacts, so as to be capable of operating in a reverse direction for the purpose of erecting the oscillating axis about which the antenna is to nod to the vertical, when azimuth scanning alone is desired.

It is to be noted that the No. 2, 3 and 4 contacts in deck D are connected to the negative bus 188 and that the lead 230 runs from the arm 186 to the vertical erecting switch 144, which may occupy two positions, one with its arm 229 in engagement with the left contact 228 when the oscillating axis is vertical, and the other in engagement with another contact 254 when the oscillating axis is not vertical, in series with the pulser or make-and-break device 181 which is constantly rotated by the pump motor 168 connected across the positive and negative buses 187, 188. The other end 185 of the pulser or make-and-break device is connected to pulsing control line 255 running to a relay 256, which is relatively fast acting, being of the solenoid type, whose plunger 257 is adapted to bridge a pair of spaced contacts 258 in a line 259 running to the armature 260 of the spindle drive motor.

The coil 261 of the relay 256 is connected to a line 262 having a contact 263 and also a branching line 264 running to another contact 265. The first-mentioned contact 263 may be engaged by a relay arm 266 connected to a lead 267 running to the negative bus 188. The other branching contact 265 may be engaged by a relay arm 268 connected to a lead 269 in series with the motor field coil 270 and connected to the positive bus 187. These last-mentioned arms are actuated by a relay 271, of the double pole, double throw, reversing type, having a slower rate of operation than the solenoid relay 256, being of the clapper type and having one end of its coil 272 connected to the negative bus lead 267, and its other end connectible through the tilt interlock switch 156 to the lead 230 running to the arm 186 in deck D.

The other lead 273 from the spindle drive motor armature 260 has a branching lead 274 through a resistance 275 to a contact 276 engageable by the upper clapper relay arm 266, and another branching lead 276a running to a contact 277 engageable by the lower clapper arm 268, in order to determine the direction of rotation of the drive motor, depending upon the position of the clapper relay switch arms 266, 268.

As aforesaid, the spindle driving motor can only be rotated in its normal direction in the event that the tilt angle of the reflector 35 is zero. Such rotation of the drive motor to obtain spiral scanning occurs when the manual arms 186 of decks C and D are in engagement with the No. 5 contacts, which completes the circuit through the clapper relay 271 and causes it to move the switches 266, 268 upwardly into engagement with the upper contacts 263, 277, placing the lower lead 276, 273 from the drive motor in series with the series field 270 and connecting it to the positive bus 187. Momentarily, the circuit through the upperlead 259 of the drive motor is open, but the engagement of the upper relay arm 266 with the upper contact 263 completes the circuit through the fast operating solenoid relay 256, through the lead 255 and arm 186 of deck C, causing it to attract its plunger 256 and bridge the contacts 258 across the upper lead 259 and connecting it to the negative bus 188, thereby completing the circuit through the drive motor 135, which then rotates in its normal direction for rotating the scanner mechanism about the longitudinal axis of the apparatus.

When the spindle 15 is to be rotated in a normal direction by the spindle drive motor 135, the manual controls 186 have been moved into engagement with the No. 5 contact, which places the zero tilt potentiometer arm 211 in the circuit. In the event that the tilt angle is different from zero, the tilt interlock switch 156 will be open, preventing completion of the circuit to the drive motor 135 so as to cause its rotation in its normal direction. The tilt mechanism must, therefore, first restore the tilt angle to zero, which causes the cam 161 to allow the tilt interlock switch 156 to close, whereupon the motor 135 may be rotated or driven in the manner indicated above.

In the event that azimuth scanning alone is desired after spiral scanning (which includes rotation of the spindle) has occurred, the manual control mechanism is moved until the arms 186 engage either the No. 4 or No. 3 contact. Such contact effects an automatic erecting of the azimuth oscillating axis to the vertical, by means of the circuits now to be described. Engagement of the contact arms 186 with either the No. 3 or No. 4 contact connects the lead 230 to the negative bus and also places the make-and-break pulser device 184, 185 in the circuit with this lead, because the lack of vertical positioning of the spindle will mean that the erecting switch arm 229 has moved to its other position against the contact 254, in series with the pulser contact mechanism 184, 185. A circuit through the clapper type relay 271 is also completed, but no current flows therethrough since both sides of the relay coil 272 are connected to the negative bus 188. However, the circuit through the rapid operating relay 256 is completed intermittently, in accordance with the making and breaking of contact by the pulser device 181, which is being driven steadily by the pump motor 168. Such completion of the circuit through the coil 261 effects a bridging of the contacts 258, but places the upper lead 259 of the drive motor in series with the field coil 270 connected to the positive bus 187, through the lower contact 265 and arm 268, and places the lower lead 273 of the drive motor in the series with the resistance 275 and in the circuit with the negative bus 187, through the contact 276 and switch arm 266. As a result, the drive motor rotates in a reverse direction because of the reverse polarity therethrough, and, in view of the resistance 275 in series with the armature 260 and the intermittent application of current to the rapid operating relay 256, which intermittently makes and breaks contact across the spaced contacts 258, the motor is rotated in a rearward direction intermittently at a comparatively slow speed, until the spindle 15 has been placed in such position that the vertical axis of nodding or oscillation has been restored, as indicated by reverse movement of the erecting mechanism 144 and engaging of the finger 147 with the plunger 155, which moves the switch 229 over to the left contact 228 shown in the diagram, thereby breaking the circuit to the relay 256 and to the drive motor 135, which then remains stationary. The erecting mechanism 144 breaks the motor circuit when the feed horn shaft 25 is vertically disposed, the yoke 147 and slide 53 being above the longitudinal axis.

In the event that azimuth scanning alone is desired, and in the further eventuality that the manual tilt control 209 has been set for either a positive or negative degree of tilt, the switching of the main arms 186 from their No. 5 contacts to either the No. 4 or the No. 3 contacts will cause the tilt return potentiometer 165 and the manual tilt control to act in concert and operate the micropositioner switch 216 in such manner as to restore the degree of tilt to the selected extent.

As noted above, during normal spindle rotation by the drive motor 135, both the slow and high speed relays 271, 256 are energized with the arms 186 engaging the No. 5 contacts. Upon switching to the No. 5 contacts, the circuit through the high speed relay 256 cannot be completed until the slow speed relay 271 has pulled up its arms 266, 268 into engagement with the upper contacts 263, 267, whereupon the high speed relay 256 may close the motor circuit for manual rotation. In switching from No. 5 to No. 4 or No. 3 contacts, however, the circuits through both relays are opened, but the high speed relay 256 breaks the circuit at 258 to the motor 135 before the slow speed relay arms 266, 268 can begin moving down, thereby preventing the back E. M. F. of the motor from arcing across the slow speed contacts. In general, damping resistors 278 are connected across the relay coils to prevent arcing across their contacts.

It is, accordingly, apparent that a radar scanner antenna mechanism has been provided, capable of functioning in several selected manners. Spiral scanning can take place through rotating the antenna reflector 35 and feed horn 24, 33 while nodding them at either of two different amplitudes of oscillation and at two different speeds. Such nodding may occur through a wide angle and at a slow speed, or through a narrow angle and at a higher speed. In addition, azimuth scanning alone can take place through either of the aforementioned amplitudes of oscillation and at the aforementioned oscillating speeds. In addition, during azimuth scanning alone, the tilt angle of the parabolic reflector 35 may be changed either upwardly or downwardly with respect to the horizontal, within limits, or the tilt angle may remain at a zero position. The mechanism is designed to transmit radio frequency electrical energy through the wave guide and its feed horn, and through the windows onto the reflecting surface in varying directions, depending upon the extent of scanning and the type of scanning. The impinging of such beam on a target will produce its echoing or reflection back to the reflector for transmission through the windows, feed horn and the wave guide to the receiving mechanism for proper indication on the radar scope of the angle or quadrant in which the target is located, in view of the synchronization between the azimuth scanning and the azimuth potentiometer 119.

Assurance is had that the nodding axis is automatically restored to the vertical when azimuth scanning alone is to occur, and assurance is also had that the spindle 15 cannot be rotated unless the tilt angle is zero, the movement to a zero position being automatically accomplished as a result of selecting the spiral scanning position. Conversely, the shifting from spiral scanning to azimuth scanning alone will automatically reposition the preselected angle of tilt.

While I have shown the preferred form of my invention, it is to be understood that various changes may be made by those skilled in the art without departing from the spirit of the invention as defined in the appended claims.

Having thus described my invention, what I claim and desire to secure by Letters Patent is:

1. Radar scanning apparatus, including a spindle rotatable about a longitudinal axis, a feed horn shaft carried by said spindle for oscillation about an axis which is transverse to the longitudinal axis, a reflector carried by said feed horn shaft for tilting about a third axis at right angles to said longitudinal and transverse axes, means for rotating said spindle and oscillating said feed horn shaft, means for tilting said reflector, and means responsive to movement of said reflector about said third axis for preventing operation of said spindle rotating means unless the angle of tilt of said reflector with respect to said longitudinal axis is zero.

2. Radar scanning apparatus, including an antenna, a first means for supporting said antenna for rotation about a longitudinal axis, a second means for supporting said antenna on said first means for oscillation about a transverse axis at right angles to said longitudinal axis, a third means for supporting said antenna on said second means for tilting about a third axis at right angles to said longitudinal and transverse axes, means for rotating said first means, means for oscillating said second means, means for tilting said third means on said second means, and means responsive to movement of said antenna about said third axis for preventing operation of said means for rotating said first means unless the angle of tilt of said antenna with respect to said longitudinal axis is zero.

3. Radar scanning apparatus, including an antenna, a first means for supporting said antenna for rotation about a longitudinal axis, a second means for supporting said antenna on said first means for oscillation about a transverse axis at right angles to said longitudinal axis, a third means for supporting said antenna on said second means for tilting about a third axis at right angles to said longitudinal and transverse axes, means for rotating said first means, means for oscillating said second means, means for tilting said third means on said second means, and means for maintaining the angle of tilt of said antenna with respect to said longitudinal axis at zero degrees during rotation of said first means about said longitudinal axis.

4. Radar scanning apparatus, including an antenna, a first means for supporting said antenna for rotation about a longitudinal axis, a second means for supporting said antenna on said first means for oscillation about a transverse axis at right angles to said longitudinal axis, a third means for supporting said antenna on said second means for tilting about a third axis at right angles to said longitudinal and transverse axes, a fourth means for rotating said first means, a fifth means for oscillating said second means, a sixth means for tilting said third means on said second means, means responsive to movement of said antenna about said third axis for preventing operation of said fourth means unless the angle of tilt of said antenna with respect to said longitudinal axis is zero, means for controlling operation of said fourth means, and means operable upon movement of said controlling means to a position for initiating operation of said fourth means for causing said sixth means to tilt said antenna to a zero tilt angle.

5. Radar scanning apparatus, including a spindle rotatable about a longitudinal axis, a feed horn shaft carried by such spindle for oscillation about a transverse axis, a reflector carried by said feed horn shaft for tilting about a third axis at right angles to said longitudinal and transverse axes, means comprising an electric motor for rotating said spindle, means comprising an electric motor for oscillating said feed horn shaft, means comprising an electric motor for tilting said reflector about said third axis, means responsive to movement of said reflector about said third axis for preventing operation of said spindle rotating motor unless the angle of tilt of said reflector with respect to said longitudinal axis is zero, means for controlling operation of said spindle rotating motor, and means operable upon movement of said controlling means to a position in which it may initiate operation of said spindle rotating motor for causing said tilt motor to move said reflector to a zero tilt angle.

6. Radar scanning apparatus, including a spindle rotatable about a longitudinal axis, a feed horn shaft carried by said spindle for oscillation about a transverse axis, a reflector carried by said feed horn shaft for tilting about a third axis at right angles to said longitudinal and transverse axes, means comprising an electric motor for rotating said spindle, means comprising an electric motor for oscillating said feed horn shaft, means comprising an electric motor for tilting said reflector about said third axis, means responsive to movement of said reflector about said third axis for preventing operation of said spindle rotating motor unless the angle of tilt of said reflector with respect to said longitudinal axis is zero, means for controlling operation of said spindle rotating motor, means operable upon movement of said controlling means to a position in which it may initiate operation of said spindle rotating motor for causing said tilt motor to move said reflector to a zero tilt angle, means for reversing the direction of rotation of said spindle rotating motor to vertically position said feed horn shaft transverse axis, and means for stopping said spindle rotating motor upon vertical positioning of said transverse axis.

7. Radar scanning apparatus, including an antenna having a longitudinal axis, a first means for supporting said antenna for rotation about said longitudinal axis, a second means for supporting said antenna on said first means for oscillation about a transverse axis at right angles to said longitudinal axis, a third means for supporting said antenna on said second means for tilting about a third axis at right angles to said longitudinal and transverse axes, said mounting means mounting the antenna for independent rotation or oscillation about each of said axes and means for rotating, oscillating and tilting said antenna about said longitudinal, transverse and third axes.

TOMLINSON I. MOSELEY.

REFERENCES CITED

The following references are of record in the file of this patent:

UNITED STATES PATENTS

| Number | Name | Date |
|---|---|---|
| 1,412,283 | Hartwig | Apr. 11, 1922 |
| 1,931,656 | Hatch | Oct. 24, 1933 |
| 2,003,661 | Bassett et al. | June 4, 1935 |
| 2,099,975 | Hackman | Nov. 23, 1937 |
| 2,257,320 | Williams | Sept. 30, 1941 |
| 2,326,382 | Moreland et al. | Aug. 10, 1943 |
| 2,407,310 | Lundy et al. | Sept. 10, 1946 |
| 2,410,827 | Langstroth et al. | Nov. 12, 1946 |
| 2,410,831 | Maybarduk et al. | Nov. 12, 1946 |
| 2,412,612 | Godet | Dec. 17, 1946 |
| 2,415,678 | Edwards | Feb. 11, 1947 |
| 2,415,679 | Edwards et al. | Feb. 11, 1947 |
| 2,415,680 | Hoyt | Feb. 11, 1947 |
| 2,417,407 | Broadbent et al. | Mar. 18, 1947 |
| 2,432,036 | Noxon | Dec. 2, 1947 |
| 2,437,275 | Skene et al. | Mar. 9, 1948 |
| 2,475,746 | Kenyon | July 12, 1949 |